United States Patent [19]

Schreder

[11] Patent Number: 5,323,226
[45] Date of Patent: Jun. 21, 1994

[54] METHOD OF MEASURING LIGHT LEVELS AND DEVICE FOR IMPLEMENTING THIS METHOD

[75] Inventor: Francis J. Schreder, Linkebeek, Belgium

[73] Assignee: Financiere des Applications de L'Electricity S.A., Bruxelles, Belgium

[21] Appl. No.: 904,659

[22] Filed: Jun. 26, 1992

[30] Foreign Application Priority Data

Jun. 27, 1991 [BE] Belgium ............................ 09100617

[51] Int. Cl.$^5$ .................................. G01J 1/42
[52] U.S. Cl. ........................ 356/218; 356/221; 356/225
[58] Field of Search ............. 356/121, 122, 213, 218, 356/221, 225, 226, 227, 229, 233, 153, 214, 215, 216, 217, 219, 220, 222; 250/226, 214 AL

[56] References Cited

U.S. PATENT DOCUMENTS

| | | | |
|---|---|---|---|
| 1,546,264 | 7/1925 | Story | 356/218 |
| 2,046,665 | 7/1936 | Weston | 88/23 |
| 2,984,747 | 5/1961 | Walker | 356/215 |
| 3,314,344 | 4/1967 | Anwyl et al. | 356/225 |
| 3,582,666 | 6/1971 | Geiger | 356/219 |
| 3,667,850 | 6/1972 | Smith et al. | 356/216 |
| 5,185,637 | 2/1993 | Lewin et al. | 356/218 |

FOREIGN PATENT DOCUMENTS

| | | |
|---|---|---|
| 1192846 | 5/1965 | Fed. Rep. of Germany . |
| 1214121 | 4/1960 | France . |
| 2490363 | 3/1982 | France . |
| 439224 | 12/1935 | United Kingdom . |

Primary Examiner—Richard A. Rosenberger
Assistant Examiner—Hoa Q. Pham
Attorney, Agent, or Firm—Cushman, Darby & Cushman

[57] ABSTRACT

A method of measuring light levels, particularly the measurement of exterior light levels in the zone of approach to a tunnel in which vehicles are moving, and from which exterior light levels the minimum light level to be programed inside the tunnel can be calculated, by means of a photo-sensitive cell installed in a recessed tube in order to sense light levels contained within a cone defined by the center of the cell, which constitutes the apex of the cone, and by at least the open end of the tube. The method includes limiting the quantity of light rays entering into tube via the cone, and a device is provided for implementing the method.

19 Claims, 3 Drawing Sheets

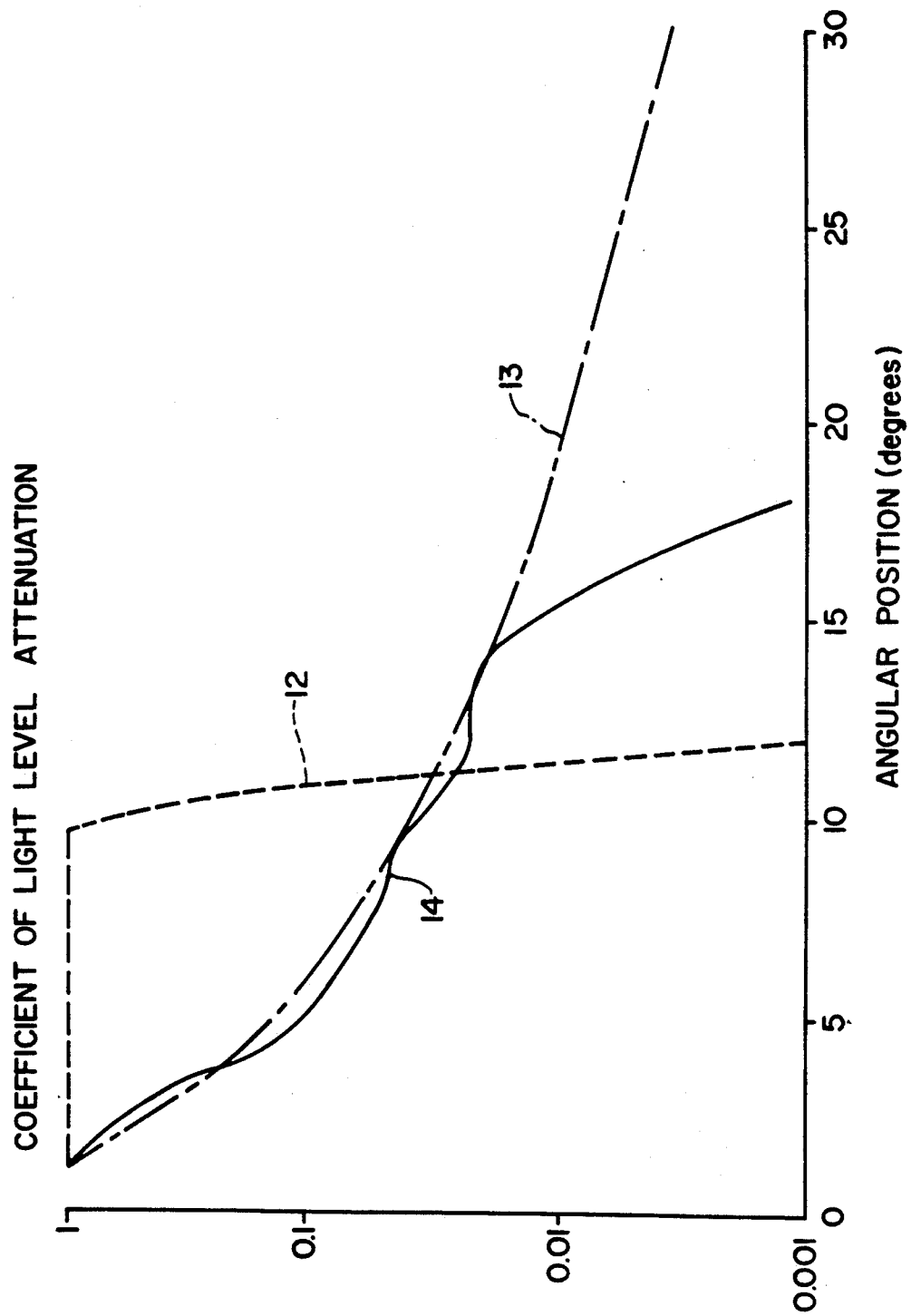

METHOD OF MEASURING LIGHT LEVELS AND DEVICE FOR IMPLEMENTING THIS METHOD

BACKGROUND OF THE INVENTION

This invention is concerned with a method of measuring light levels, particularly the measurement of exterior light levels in the zone of approach to a tunnel in which vehicles are moving, and from which exterior light levels the minimum light level to be programed inside the tunnel can be calculated, by means of a photosensitive cell installed in a recessed tube so arranged as to sense light levels contained within a cone defined by the center of the cell, which is located along the axis of the tube and which constitutes the apex of the cone, and by at least the open end of the tube.

It is known that the interior light level in a tunnel, particularly in the mouth of the tunnel, must be adapted to the prevailing exterior light level in the zone of approach to the tunnel and that, for users entering the tunnel, this adaptation must maintain the proper level of visibility.

The idea of measuring this exterior light level—generally referred to as the adaptive light level for drivers—in order to calculate the minimum light level to be programed inside the tunnel has previously been conceived according to two distinct methods, to wit:

The first method, known as "$L_{20°}$", is one in which the light level in the zone of approach to a tunnel is treated as a constant corresponding to the arithmetic mean of light levels contained within a 20° cone of revolution, which corresponds very nearly to the driver's field of vision, the latter being limited by the edges of the windshield in the driver's vehicle.

This method is implemented by means of a light meter used in the lighting control system for tunnels. The light meter, the response curve of which is constant between 0° and 20°, consists substantially of a photosensitive cell provided at the back of a tube of circular transverse cross-section, such that the center of the light meter is located on the axis of the tube. The 20° opening of the above-mentioned cone is, on the one hand, defined by the center of the photo-sensitive cell and the rim of the tube delineating the tube's open end and, on the other hand, obtained through the means of a group of diaphragms, with openings of various diameters, aligned in planes perpendicular to the axis of the tube. The open areas of these diaphragms decrease in size along the front-to-back direction inside the tube.

Even though it has the advantage of simplicity, the $L_{20°}$ method has the disadvantage of lacking a precise physiological response to the phenomenon of light level adaptation by the human eye.

A second method, known as "$L_{seq}$", is based on the fact that it is essential to determine the light level to which the driver's eye is physiologically adapted in the zone of approach to the tunnel in order to calculate the light required inside the tunnel, and particularly in the mouth of the tunnel.

The factor that influences adaptive light level is the light level under haze conditions ($L_{seq}$) equivalent to that produced by the various light levels in a vehicle driver's field of vision.

According to known researchers, such as STILES, HOLLADAY, and FRY, said light level $L_{seq}$ obeys the following law: Light level $L_{seq}$ is directly proportional to the illumination falling on the eye from various light sources in the eye's field of vision, and inversely proportional to the square of the angle between the direction of view and the light source.

Thus, in measuring light levels that will determine the light level at the mouth of a tunnel, this method involves taking into consideration the various light levels in a vehicle driver's field of vision. A light meter capable of making aforesaid measurement, in accordance with the law stated above, requires a lens (known as a "FRY lens") which is highly complicated and very costly; this has the disadvantage of restricting the application of $L_{seq}$ method and the use of such a light meter.

SUMMARY OF THE INVENTION

The invention described herein is intended to accomplish a measurement method, of the type described in the second method above, that determines the light level to which the driver's eye is physiologically adapted at the approach to a tunnel, without making use of particularly complex or costly equipment, including the above-mentioned FRY lens; this would allow widespread use of said method described herein.

With this end in view, as disclosed by the invention, this method consists of limiting the quantity of light rays entering the tube via the aforesaid cone.

In keeping with one advantageous embodiment of the invention, the quantity of rays entering aforesaid cone is selectively limited, depending on the incidence angle of these rays.

In accordance with one particularly advantageous embodiment of the invention, the quantity of light rays entering aforesaid cone progressively decreases as the angle of incidence of these rays increases.

The invention also pertains to a device for implementing aforesaid method.

According to the invention, this device includes a recessed tube with a photo-sensitive cell installed inside this tube so that, on the one hand, the center of this photo-sensitive cell is located on the axis of the tube and, on the other, this center and the open end of the tube define the aforesaid cone and an opaque screen fitted in the tube, in the immediate vicinity of the tube opening so as to intercept all light rays entering aforesaid cone that are capable of striking the cell and included in said cone. The screen displays spots that enable selected light rays to enter the interior of the cone in order to strike the aforesaid cell.

BRIEF DESCRIPTION OF THE DRAWINGS

Other details and features of the invention will be brought out by the description of the drawings attached hereto which illustrate the aforesaid method and depict, by means of a non-limitative example, one particular embodiment of the device according to the invention.

In the drawings:

FIG. 3 is a graph showing, in a comparative way, the response curves of light meters operating in accordance with the methods described above.

In FIGS. 1, 2, and 3, identical reference numbers refer to the same item.

DETAILED DESCRIPTION

Figure 1:
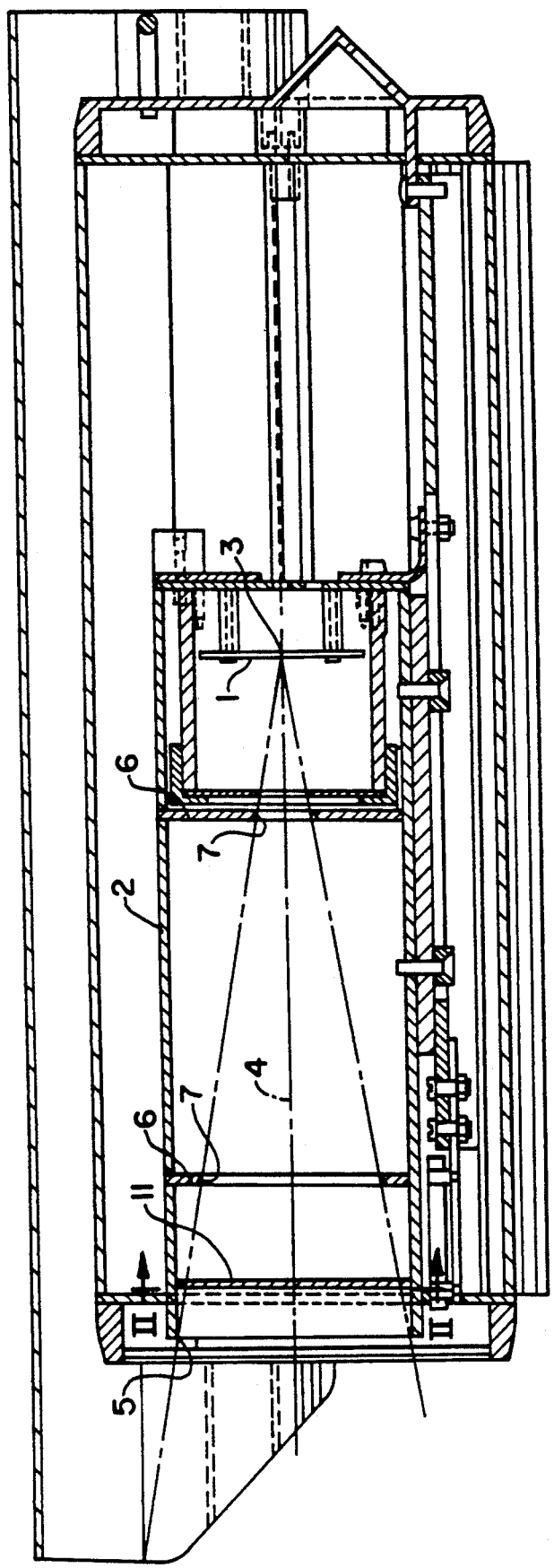
FIG. 1 is a vertical longitudinal sectional view of a device for implementing the method of the present invention.

The method of measuring light level, as provided by the invention and illustrated by the drawings, is especially designed to measure exterior light levels in the zone of approach to a tunnel for vehicles, from which exterior light levels the minimum light level to be programed inside the tunnel and, more particularly, at the mouth of the tunnel, can be derived. This light level measurement is made by means of photo-sensitive cell 1 installed in recessed tube 2 so as to sense light levels contained within a cone defined by: center 3 of photo-sensitive cell 1, which is located on axis 4 of tube 2 of circular cross-section, and which is the apex of the cone; by opening 5 of tube 2; and by diaphragms 6 with openings 7 progressively decreasing in size along a line from the open end 5 of the tube that are mainly intended to prevent parasitic light ray reflections from striking the interior walls of tube 2.

This method consists of limiting the quantity of light rays entering tube 2 via the aforesaid cone which is, in the example shown by the drawings, a cone of revolution the axis of which coincides with axis 4 of the tube. The quantity of light rays entering said cone is selectively limited, in accordance with the angle of incidence of these rays, such that the quantity of rays allowed to enter progressively decreases as the angle of incidence of these rays increases.

Figure 2:
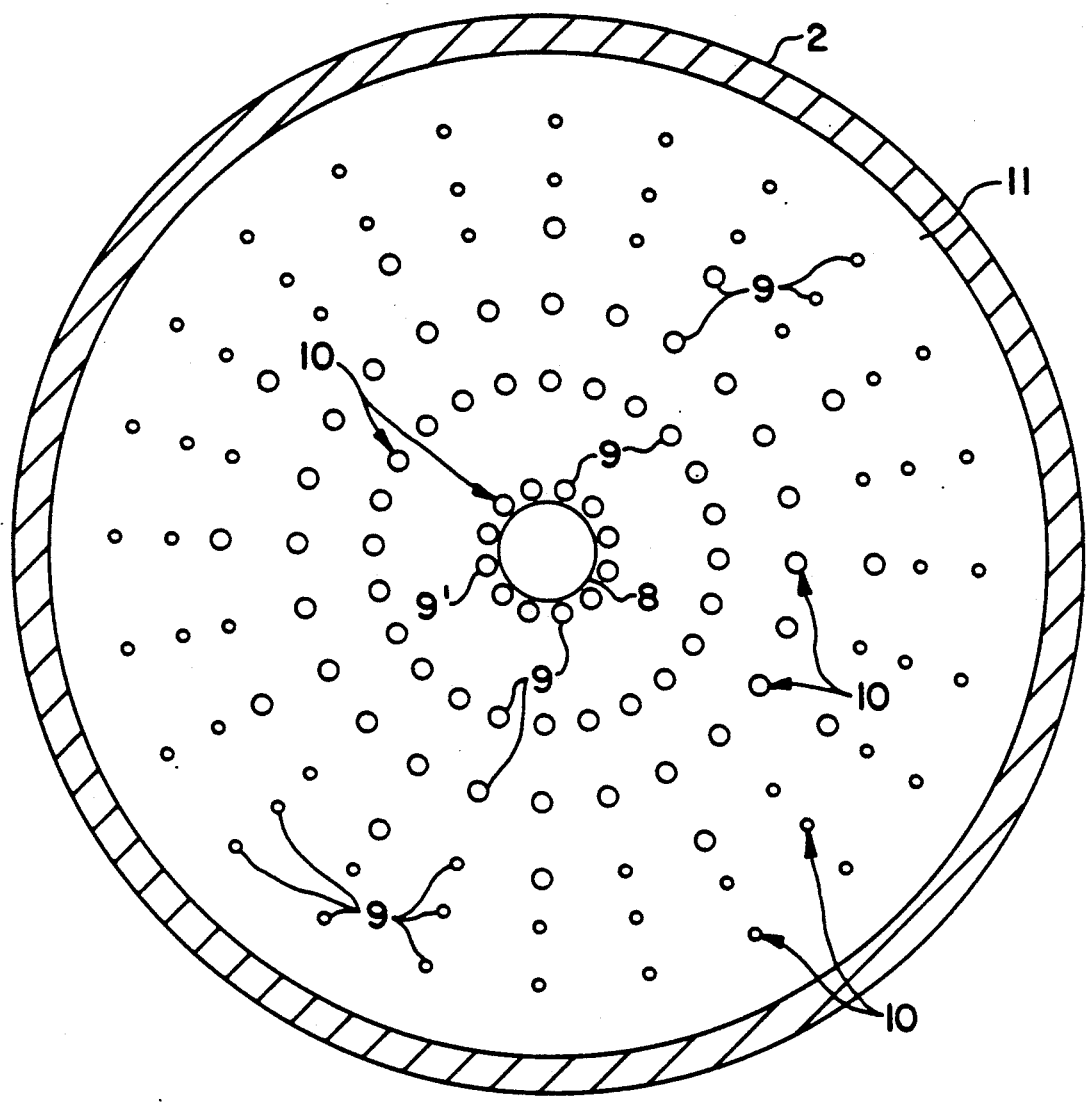
FIG. 2 is a transverse cross-sectional view, viewed in the direction II—II of FIG. 1. This view shows in detail, and on a larger scale than that of FIG. 1, the screen installed in the device.

As shown in FIG. 2, light rays are optimally introduced into the aforesaid cone through central circular 8 in opaque screen 11, the rays entering along the axis of said cone which has an opening of approximately 36°; incident rays are admitted into the cone through spots 9 which are evenly distributed in circles 10, the centers of which are located on axis 4 of tube 2.

The surface areas of aforesaid spots 9, through which the incident rays are allowed to pass, are substantially equal on each of the circles 10, although the surface areas of these circles progressively decrease as the diameters of circles 10 increase. These spots are optimally distributed in a plane perpendicular to axis 4 of tube 2 and in aforesaid circles 10, which are concentric; moreover the spots 9 are aligned radially.

The light level measuring device, as provided by the invention and as shown by FIGS. 1 and 2, includes: aforesaid recessed tube 2, with a circular cross-section; aforesaid photo-sensitive cell I installed inside tube 2 such that, on the one hand, center 3 of this cell is located on axis 4 of the tube and, on the other hand, center 3 and opening 5 of the tube define the aforesaid cone and an opaque screen 11 installed inside tube 2 near its opening 5 in order to intercept all light rays capable of striking cell 1 and included in the cone. The screen 11 displays spots 9, which constitute the aforesaid spots, that allow selected light rays to pass into the interior of the cone in order to strike photo-sensitive cell 1. Screen 11 is a flat disk of circular cross-section installed in tube 2 substantially at right angles with the axis of the tube.

Aforesaid spots 9 of said screen 11 are circular in form and are distributed in central region 9', the center of which is located on axis 4 of tube 2: spots 9 are also evenly distributed in circles that are concentric to central region 9'. The diameters of spots 9 located on the same circle 10 are substantially equal, and the diameters of spots 9 located on circles 10 closest to the rim of screen 11 become progressively smaller in size as the diameters of circles 10 increase.

FIG. 3 shows three response curves, 12, 13, and 14, obtained with the use of light meters and allows for comparing curve 12, obtained when using the $L_{20}$ method mentioned above, and curves 13 and 14 obtained when using the aforesaid $L_{seq}$ method. Curve 13, which is currently considered as being the ideal response, was obtained using a device equipped with the FRY lens mentioned above. Curve 14, which is equivalent to said curve 13, was obtained by means of a device as provided in accordance with the present invention.

In order to obtain response curve 14, the device was equipped with screen 11. Spots 9 of the screen 11, which encircle central region 9', are distributed in six concentric circles 10. The first of these six circles—the one with the smallest diameter—has a diameter slightly larger than the diameter of central region 9'. The distance separating the first circle from the second is substantially equal to the diameter of central region 9', whereas the distances that separate the other four circles 10 are substantially equal. The sixth circle—the one with the largest diameter—, together with center 3 of photo-sensitive cell 1, defines a cone the opening of which is approximately 36°.

The spots 9 distributed over the second through the sixth circles are radially aligned such that the angles formed by the radii are substantially equal and approximately 15° in magnitude. For a screen 11 with a surface area of 5,944 mm², the area of central region 9' is approximately 46 mm², whereas the areas of each zone 9 distributed around the first to the sixth circles 10 are, respectively: 0.65 mm², 0.65 mm², 0.65 mm², 0.43 and 0.65 mm², alternately, 0.43 mm² and 0.43 mm², with the total surface area of spots 9 and 9' being approximately 103 mm².

Screen 11 is fabricated either from a translucent material, such as glass made partially opaque by silk-screening, for example, or fabricated from sheet metal drilled with holes that form aforesaid spots 9 and 9'.

It should be understood that the invention is by no means limited to the embodiment described herein, and that various modifications can indeed be made to that embodiment without departing from the framework this invention.

I claim:

1. A method of monitoring exterior light levels in a zone of approach to a tunnel in which vehicles are moving, for adjusting levels of minimum illumination inside the tunnel, comprising:

measuring light levels in the zone of approach to the tunnel by using a photo-sensitive cell which is axially recessed in a tube relative to an end of the tube, the tube having a longitudinal axis which intersects said cell and on which said cell is centered and having first structure effectively defining a cone having an apex on said axis at said cell, coaxial with said tube and increasing in diameter towards said end of said tube; while limiting the quantity of light rays entering into said cone at said end of said tube by placing effectively across said end of said tube a second structure having a preselected pattern of light transmissivity which pattern is centered on said axis.

2. The method of claim 1, wherein:

said pattern on said second structure which is placed effectively across said end is preselected to limit said quantity of light rays in accordance with magnitude of radial displacement of incidence of those rays on that structure relative to said axis.

3. The method of claim 1, wherein:

said pattern on said second structure which is placed effectively across said end is preselected to limit said quantity of light rays in accordance with magnitude of radial displacement of incidence of those rays on that structure relative to said axis so as to progressively decease said quantity upon increases in said radial displacement.

4. The method of claim 1, wherein:

said tube in which said cell is recessed is of substantially circular internal transverse cross-sectional shape, and said first structure defines said cone so as to be circular in transverse cross-sectional shape.

5. The method of claim 4, wherein:

said preselected pattern of said second structure, which is placed effectively across said end includes a plurality of radially spaced circles of equiangularly distributed spots of relatively high light transmissivity, provided on a ground of relatively low light transmissivity.

6. The method of claim 5, wherein:

in said preselected pattern, all of said spots in each respective circle are of equal given area, which given area progressively decreases from circle to circle in said series with increasing diameter from said axis.

7. The method of claim 6, wherein:

said second structure is substantially planar and arranged perpendicular to said axis, and in said preselected pattern equal numbers of said spots are provided in a plurality of said circles and from circle to circle in said plurality of circles all of said spots are centered on respective equiangularly spaced radii each of which intersects a respective said spot in each circle of said plurality of circles.

8. The method of claim 4, wherein:

said first structure provides said cone with an included angle of 36°.

9. A device for monitoring light levels in a zone of approach to a tunnel in which vehicles are moving, for adjusting levels of minimum illumination inside the tunnel, comprising:

a photo-sensitive cell which is axially recessed in a tube relative to an end of the tube, the tube having a longitudinal axis which intersects said cell and on which said cell is centered and having first structure effectively defining a cone having an apex on said axis at said cell, coaxial with said tube and increasing in diameter towards said end of said tube; and a second structure limiting the quantity of light rays entering into said cone at said end of said tube, said second structure being placed effectively across said end of said tube and having a preselected pattern of light transmissivity which pattern is centered on said axis;

said preselected pattern includes a plurality of spots of relatively high light transmissivity provided on a ground of relatively low light transmissivity.

10. The device of claim 9, wherein:

said second structure is substantially planar and arranged perpendicular to said axis.

11. The device of claim 9, wherein:

said tube in which said cell is recessed is of substantially circular internal transverse cross-sectional shape.

12. The device of claim 9, wherein:

said preselected pattern of said second structure, which is placed effectively across said end includes a plurality of radially spaced circles of equiangularly distributed spots of relatively high light transmissivity, provided on a ground of relatively low light transmissivity, said spots each being circular.

13. The device of claim 12, wherein:

in said preselected pattern, all of said spots in each respective circle are of equal given diameter and, therefore, area.

14. The device of claim 12, wherein:

said given area progressively decreases from circle to circle in said series with increasing diameter from said axis.

15. The device of claim 12, wherein:

said preselected pattern further includes a central circular spot centered on said axis;

there are six said circles of spots, the smallest diametered one of which has a diameter which is only slightly larger than that of said circular spot, the next-to-smallest diametered on of which has a sufficiently large diameter as to radially space spots in said smallest diametered circle from spots in said next-to-smallest diametered circle by an amount which is substantially equal to the diameter of said central spot, the remaining four of said circles being serially equally radially spaced from one another, and the spots in the largest diametered one of said circles lying on said cone; and said cone having an included angle of 36°.

16. The device of claim 15, wherein:

in said preselected pattern, equal numbers of said spots are provided in said next-to-smallest through said largest diametered circles, and in these five circles all of said spots are centered on respective equiangularly spaced radii each of which intersects a respective said spot in each circle of said five circles, said radii being serially spaced 15° apart around said axis.

17. The device of claim 15, wherein:

said second structure has a surface area presented towards said rays of 5,944 mm², out of which said central spot has an area of about 46 mm², and said spots in said smallest diametered through largest diametered circles individually have areas respectively of 0.65 mm², 0.65 mm², 0.65 mm², alternately 0.45 mm² and 0.65 mm², 0.43 mm² and 0.43 mm² and collectively have a surface area of about 103 mm².

18. The device of claim 9, wherein:

said second structure is a plate of translucent glass bearing a silk-screened coating of opaque material providing said ground.

19. The device of claim 9, wherein:

said second structure is a plate of metal having holes formed therethrough providing said spots.

* * * * *